United States Patent
Ivershen (10) Patent No.: US 9,426,046 B2
(45) Date of Patent: Aug. 23, 2016

(54) WEB PAGE DOWNLOAD TIME ANALYSIS

(71) Applicant: Tektronix, Inc., Beaverton, OR (US)

(72) Inventor: Aleksey G. Ivershen, Garland, TX (US)

(73) Assignee: Tektronix Texas, LLC, Westford, MA (US)

( * ) Notice: Subject to any disclaimer, the term of this patent is extended or adjusted under 35 U.S.C. 154(b) by 803 days.

(21) Appl. No.: 13/723,638

(22) Filed: Dec. 21, 2012

(65) Prior Publication Data

US 2013/0166738 A1 Jun. 27, 2013

Related U.S. Application Data (60) Provisional application No. 61/580,463, filed on Dec. 27, 2011.

(51) Int. Cl.
*H04L 12/26* (2006.01)
*H04L 29/08* (2006.01)
*H04L 12/24* (2006.01)

(52) U.S. Cl.
CPC .............. *H04L 43/08* (2013.01); *H04L 67/02* (2013.01); *H04L 67/22* (2013.01); *H04L 41/046* (2013.01); *H04L 43/0882* (2013.01); *H04L 43/0888* (2013.01)

(58) Field of Classification Search
CPC . H04L 41/046; H04L 43/0882; H04L 67/02; H04L 43/08; H04L 67/22
See application file for complete search history.

(56) References Cited

U.S. PATENT DOCUMENTS

| | | | |
|---|---|---|---|
| 7,246,101 B2* | 7/2007 | Fu | H04L 29/06 706/46 |
| 8,549,138 B2* | 10/2013 | Bar-Caspi | G06F 11/3414 709/219 |
| 2010/0299588 A1* | 11/2010 | Dattilo | G06F 3/1205 715/234 |
| 2012/0220261 A1* | 8/2012 | Grefen | H04L 43/0876 455/406 |
| 2012/0290909 A1* | 11/2012 | Speirs | G06F 17/30905 715/205 |
| 2013/0124698 A1* | 5/2013 | Saxena | G06F 17/30902 709/219 |
| 2014/0160969 A1* | 6/2014 | Grefen | H04L 43/0876 370/252 |

* cited by examiner

*Primary Examiner* — Abdullahi E Salad
(74) *Attorney, Agent, or Firm* — Locke Lord LLP; Scott D. Wofsy; Christopher J. Capelli (57) ABSTRACT

Systems and methods for determining web page download times are described. HTTP transactions data is collected from flow records or PDUs. A subscriber IP address, HTTP URI, and referrer are extracted from the flow records. A subscriber record is identified using the subscriber IP address, and a configured web page is identified using the HTTP URI. A processing path is then determined for the HTTP transaction The processing path is selected from one of: a new page download path for a configured page, a collision path for HTTP transactions that collide with an existing page download, and a page object path for artifacts pages that are already being tracked.

14 Claims, 4 Drawing Sheets

*FIG. 1*

| Number | Time | Duration | Host | URI | Referrer | Content Type |
|---|---|---|---|---|---|---|
| 1 | 13.098 | 604 | google.fr | / | null | text/html; charset=UTF-8 |
| 2 | 13.725 | 907 | www.google.fr | / | null | text/html; charset=UTF-8 |
| 3 | 14.915 | 335 | www.google.com | /images/srpr/logo3w.png | http://www.google.fr/ | image/png |
| 4 | 15.047 | 808 | www.google.fr | /extern_js/f/... | http://www.google.fr/ | text/javascript; charset=UTF-8 |
| 5 | 15.072 | 480 | www.google.fr | /mbd?mbtype=56&hl=fr | http://www.google.fr/ | text/html; charset=UTF-8 |
| 6 | 17.065 | 320 | www.google.fr | /client_204?&biw=320&bih=356&ei= | http://www.google.fr/ | text/html; charset=UTF-8 |
| 7 | 17.07 | 627 | clients1.google.fr | /generate_204 | http://www.google.fr/ | text/html |
| 8 | 17.075 | 622 | www.gstatic.com | /m/images/gray_dot.png | http://www.google.fr/ | image/png |
| 9 | 17.746 | 258 | www.google.fr | /images/nav_logo86.png | http://www.google.fr/ | image/png |
| 10 | 17.913 | 89 | www.google.fr | /csi?v=3&s=mobilewebhp&action=&e=28936... | http://www.google.fr/ | image/gif |
| 11 | 18.745 | 175 | www.google.com | /csi?v=3&s=mog&action=default_load_1&... | http://www.google.fr/ | image/gif |
| 12 | 34.041 | 862 | www.google.fr | / | null | text/html; charset=UTF-8 |
| 13 | 35.184 | 329 | www.google.com | /images/srpr/logo3w.png | http://www.google.fr/ | null |
| 14 | 35.314 | 198 | www.google.fr | /mbd?mbtype=56&hl=fr | http://www.google.fr/ | text/html; charset=UTF-8 |
| 15 | 35.338 | 477 | www.google.fr | /extern_js/f/... | http://www.google.fr/ | null |
| 16 | 37.014 | 338 | www.google.fr | /client_204?&biw=320&bih=356&ei= | http://www.google.fr/ | text/html; charset=UTF-8 |
| 17 | 37.016 | 400 | www.gstatic.com | /m/images/gray_dot.png | http://www.google.fr/ | null |
| 18 | 37.357 | 299 | clients1.google.fr | /generate_204 | http://www.google.fr/ | text/html |
| 19 | 37.836 | 128 | www.google.fr | /csi?v=3&s=mobilewebhp... | http://www.google.fr/ | image/gif |
| 20 | 38.709 | 176 | www.google.com | /csi?v=3&s=mog&action=default_load_1... | http://www.google.fr/ | image/gif |
| 21 | 54.858 | 612 | www.tf1.fr | / | Null | text/html |

WEB PAGE DOWNLOAD TIME ANALYSIS

CROSS-REFERENCE TO RELATED APPLICATION

This application claims the benefit of the filing date of U.S. Provisional Patent Application No. 61/580,463, which is titled "Determining Web Page Download Times" and was filed on Dec. 27, 2011, the disclosure of which is hereby incorporated by reference herein in its entirety.

BACKGROUND

The time required to access a page on a web site typically varies across different devices, browsers, and networks. Web page access time may be used to evaluate the operation of these devices, browsers, and networks. For example, a web page download time Key Performance Indicator (KPI) may be defined as the time elapsed from the moment a user enters a web page URL into a browser until the time when all artifacts related to that web page have downloaded and page rendering by the browser is complete.

The web page download time KPI may be of interest to mobile network operators for several reasons. The web page download time KPI is an objective measurement of a mobile subscriber's experience and satisfaction, particularly because web browsing is the number one service used in mobile networks. The web page download time KPI allows network operators to detect problems with particular handset types or handset software versions in the network and to request handset manufacturers to provide fixes for those problems to reduce customer care calls. Mobile network operators may also use the web page download time KPI to examine and fine-tune hosted websites and portals for optimal user experience. For example, thresholds and alarms can be set to detect when the average performance for hosted or third-party web pages is degraded, which may indicate network-related issues.

The web page download time KPI can be used to estimate uplink and downlink throughput rates that are being provided to subscribers for web browsing services. Additionally, mobile network operators may use web page download time KPIs to pinpoint network locations where service is degraded.

Currently, the most direct and precise method to measure web page download time KPIs is embedding a software agent in a web browser. The software agent then reports web page download times to a centralized data collection entity. Because the browser knows exactly when the web page download started and ended and knows how many objects were retrieved, a browser agent can provide highly accurate web page download time KPIs. However, this approach is not practical because it requires software agents adapted for a multitude of handsets, browsers, and user agents. Additionally, user privacy concerns make it an unrealistic approach for network-wide use.

Embedded page scripting, such as JavaScript, may be used to embed logic in a web page to trigger sending web page download statistics to the server. Once the web page completes downloading and rendering, the browser automatically executes commands, such as calculating and sending the web page download statistics. However, this approach cannot be used for web pages that lack these embedded scripts or on handsets or laptops that either lack JavaScript capability. Additionally, these statistics cannot include throughput and other measurements because TCP stack control frames and retransmissions are not visible to the browser.

These and other known approaches for measuring web page download time are not practicable in a passive monitoring system that does not have access to subscriber browser data. Accordingly, other methods of estimating web page download time must be used by network operators to determine the web page download time KPIs for different subscribers.

SUMMARY

Embodiments of systems and methods for determining web page download times are described herein. The web page download times may be used, for example, to measure the subscriber Quality of Experience (QoE) in the network. Although, the examples described below refer to a mobile network, these techniques may be applied to any public or private network, such as an intranet, Internet, local area network (LAN), or wide area network (WAN). A network operator can evaluate network operation across different perspectives, such as by device, browser, configuration, software version, node, cell, link, interface, or any other network parameter. The KPIs may be used to evaluate overall network performance to get general trends or to evaluate performance for specific areas or configurations. For example, using the web page download times KPIs described herein, the network operator can compare the operation of different devices, browsers, or network cells and use this information to adjust the network's performance as needed.

The web page download times KPIs are collected using a pre-defined set of web pages that are widely used by multiple users and devices, which allows for an apples-to-apples comparison across different dimensions and network segments. The KPIs can be used to measure uplink and downlink throughput, data volume, and data speeds.

In some embodiments, one or more of the methods described herein may be performed by one or more computer systems. In other embodiments, a tangible computer-readable storage medium may have program instructions stored thereon that, upon execution by one or more computer or network monitoring systems, cause the one or more computer systems to perform one or more operations disclosed herein. In yet other embodiments, a system may include at least one processor and a memory coupled to the at least one processor, the memory configured to store program instructions executable by the at least one processor to perform one or more operations disclosed herein.

BRIEF DESCRIPTION OF THE DRAWINGS

Reference will now be made to the accompanying drawings, wherein:

FIG. 2 is a table of HTTP objects downloaded from example data captures in a mobile network.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mea-n "including, but not limited to."

DETAILED DESCRIPTION

When determining web page download time (WPDT) KPIs, it is impractical to track all web pages that might be accessed by users as suggested in some other approaches. An initial problem is that it is difficult to precisely define what constitutes a web page. It is not useful or accurate to calculate WPDT KPIs using millions of infrequently visited web pages that might be visited by every user on a mobile network. Instead, the system described herein for monitoring and reporting WPDT measurements focuses on tracking a pre-defined set of frequently visited web pages. This set of frequently visited web pages provide a standardized basis for tracking and comparing the same data across the entire mobile network and across different user equipment families.

The set of frequently visited web pages may be defined in a configuration list comprising a number of primary service URLs. For example, the following list of websites receive thousands of visits or "hits" per hour and would provide a large volume of data from many different device types at multiple locations on the mobile network:
  www.google.com,
  www.facebook.com, and
  www.cnn.com/index.shtml.

Additionally, mobile variants of these pages would automatically be tracked as separate and distinct measurements by looking for the common subdomains, such as:
  m.google.com,
  mobile.google.com,
  iphone.google.com,
  android.google.com, and
  touch.google.com.
Each of these possible subdomains may not exist for a given website, but that would not effect on system behavior as only those subdomains actually observed in the traffic flow will be tracked.

In addition to the web page URLs, the system allows for configuration of page stop markers that are used to determine when a requested web page has completed downloading for measurement purposes. For example, the web page download time starts when the URL is requested via HTTP from the device, and the page download is considered complete when one of the following conditions is met:
  primary URL HTTP request fails with 400+ code, or redirected with 300+ code,
  page stop marker is encountered,
  user clicks off to another page, or
  four second silence is detected between page objects downloads.

Page stop markers are specific URI patterns that signify the end of the page. These are extremely important because many web pages do not actually stop loading after the page has rendered on the browser. Behind the scenes, more activity continues to happen, such as page hit counters reports, analytics reports, Twitter or Facebook gadgets updates, RSS feed or news scroll line refreshes. This activity should not be counted towards web page download time because the web page is already available to the user on the device. The page stop markers are used to ensure that this "extra" activity is not included in the relevant download time calculation. One of the most prolific examples of additional activity on a web page after it has loaded is a Google Analytics report. Once the page is complete, the browser reports statistics to the Google Analytics server by issuing a GET request with a URI that starts with "www.google-analytics.com/_utm.gif?utmv=." This can be used as solid indication of page completion for any web page. For sites that do not use Google Analytics, other stop markers may be configured.

For each of the configured web pages that are observed in the HTTP traffic, the following examples of dimension and measurement information may be provided:
  Dimensions:
  URL
  Network Nodes
  Subscriber (IMSI)
  Equipment type (e.g., IMEI or IMEISV)
  Access Point Name (APN)
  Mobile IP
  Cell ID
  Radio Access Technology (RAT) type
  Traffic handling priority
  Measurements:
  Start time
  Duration
  Status
  HTTP response code
  Number of objects
  Page size estimation
  Uplink/Downlink network bytes
  Uplink/Downlink network packets
  Uplink/Downlink effective bytes
  Uplink/Downlink retransmissions
  Uplink/Downlink average throughput
  Round-trip time average
  TCP setup time average
  Application response time average It will be understood that other dimensions and measurements may also be provided by the system and that this is not an exclusive list.

A reporting engine, such as Iris Performance Intelligence (IPI) from Tektronix Inc., may thus aggregate and present the data on multiple dimensions and over different timeframes as required by the network operations.

Embodiments of the algorithm described herein use as input HTTP Flow Records that contain zero or one complete HTTP transactions. For simplicity, the description below assumes single-transaction records; however, the same logic can be applied, for example, to a packet data unit (PDU) stream or multi-transaction Flow Records in case of aggregation or HTTP pipelining.

The following data structures are used in the system to track web page data:
  a table of configured web page URLs and their stop markers
  a map of subscriber's web pages (SUB_MAP), comprising:

Key: subscriber's IP address and link ID
Value: Map of URIs with associated Page Data objects (URI_MAP)
Page Data Objects (PDO) containing the following information, among others:
  Primary page URL
  Start time of download
  Last artifact time
  Network Nodes' (e.g., GGSN/SGSN/RNC/SGW/eNB) IP addresses
  User location information (e.g., cell)
  Access Point Name
  User Agent
  Various byte and packet counts
  TCP Round Trip Time (RTT)
  Application Response Time (ART)
  GTP Traffic Handling Priority (THP)

The algorithm and data structures allow for any number of simultaneous unique pages downloads for a given subscriber at any time.

While the algorithm described herein emphasizes core mobile interfaces where mobile subscriber information is available (e.g., Gn and S1-U/S1), the algorithm can be equally applied in mobile data center or fixed broadband environments where this information is not present and the subscriber is identified just by an IP address.

Figure 1:
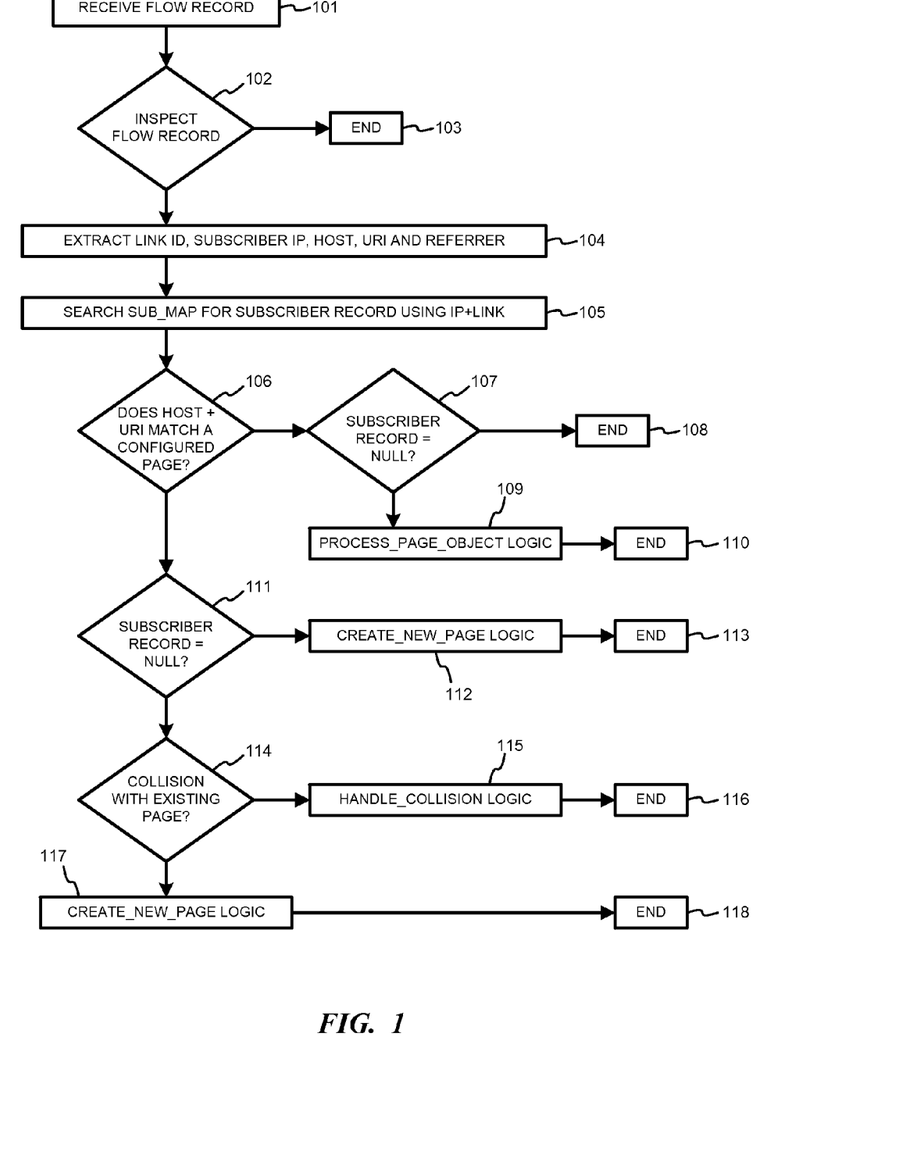
FIG. 1 is a flowchart illustrating top-level logic for analyzing web page download time according to one embodiment.

FIG. 1 is a flowchart illustrating top-level logic for analyzing web page download time according to one embodiment. In step 101, a flow record is received by the system and that flow record is examined in step 102 to verify that it has at least one HTTP transaction. If the flow record is for another protocol or for HTTP without transactions, then the process moves to step 103 and the flow record is ignored by the algorithm.

If the flow record has an HTTP transaction, then the Link identifier, subscriber IP address, HTTP host, URI and referrer are extracted in step 104. A subscriber record is looked up in the subscriber map (SUB_MAP) in step 105 using the subscriber's IP address and link ID. The Host and URI are looked up in the table of configured web pages in step 106 to determine how to process this HTTP transaction.

If the Host and URI do not match an entry in the configured web page table (e.g., www.facebook.com), then the process moves to step 107 where it evaluates the subscriber record. If the subscriber record is null (i.e., not tracking particular web pages for that subscriber), then the process ends in step 108. If the subscriber record is not null (i.e., web pages are being tracked for that subscriber), then the process moves to step 109 where the Flow Record is treated as a potential artifact of a web page that is being already tracked using the PROCESS_PAGE_OBJECT logic described below. The process then ends in step 110.

Returning to step 106, if the Host and URI do match an entry in the configured web page table (e.g., www.facebook.com), then the process moves to step 111 where it evaluates the subscriber record. If the subscriber record is null, then the process moves to step 112 where the CREATE_NEW_PAGE logic is applied as described below. In this path, the Flow Record is for the first hit on a new web page for this subscriber. The process then ends in step 113.

In step 111, if the subscriber record is not null, then the process moves to step 114 where the Flow Record is compared to existing web page tracking. If there is collision between the Flow Record and web pages already being tracked, then the process moves to step 115 where the HANDLE_COLLISION logic is applied as described below. The process then ends in step 116.

In step 114, if there is no collision between the Flow Record and web pages already being tracked, then the process moves to step 117 where the CREATE_NEW_PAGE logic is applied as described below. The process then ends in step 118.

Handling New Web Page Download Using the CREATE_NEW_PAGE Logic:

When it is determined in steps 112 or 117 that a new configured-page is being downloaded, the algorithm performs the following steps.

1) Create a subscriber entry in the subscriber map (SUB_MAP), if needed.

2) Create a new Page Data Object (PDO) and insert into subscriber's URI_MAP by using the primary web page URI as the key.

3) Look up the subscriber's GPRS Tunneling Protocol (GTP) session context. This information may be available in real time in memory in the network monitoring probes, for example.

4) From the GTP session context: (a) extract IMSI, IMEI, APN, RAT type, ULI, THP, endpoint network nodes IP addresses, and (b) populate these parameters in the PDO.

5) From the flow record: (a) extract transaction start time, bytes/packets counts, ART, RTT and other measurements, and (b) populate in the PDO.

6) Check if the transaction has a redirect or a failure response code (e.g., HTTP 301 is redirect, HTTP 304 (Not Modified) is a success response code, and any other response code above 400 is considered a failure).

7) In case of redirect or failure, the page is considered complete and is reported to upstream applications, for example, via Transaction Detail Records (XDR).

8) If the HTTP response code indicates success, insert a secondary URI key into the URI map and associate it with the same PDO.

9) Start a lifetime timer for this PDO record. The value of the timer may be selected depending on flow record delivery latency in the system. For example, a value of 60 seconds may be selected to make sure that all artifacts related to the page are received before closing it.

The secondary URI key (bullet 8 above) is related to the fact that most pages download many style sheet (.css) and JavaScript (.js) artifacts with multiple levels of indirection. One of these objects may in turn trigger the downloading of a dozen other objects. In addition, these objects' URIs tend to be very long.

To streamline the Flow Record processing and use memory resources more efficiently, a secondary URI key in the form of "hostname/!jscss!" is inserted into the URI map for subsequent searches. For example, if web page "m.cnn.com" is tracked, then "m.cnn.com/!jscss!" URI is added into the URI map.

The actual pattern of the secondary URI key is not important as long as it is guaranteed not to collide with any valid URI. This entry in URI map means that any artifacts that have CSS or JavaScript from "m.cnn.com" as the referrer will be counted towards this page download, and the algorithm thereby avoids inserting dozens of long search URIs in the search map while properly handling multiple levels of object indirection.

Handling Page Download Collision Using the HANDLE_COLLISION Logic:

This processing path occurs when the system is already tracking a web page (e.g., "www.google.com") and then sees an HTTP request to the same page. Multiple scenarios may result in web page download collision:

user opens another browser window with the same page;

user hits refresh button on the browser; or the browser refreshes the page itself, which behavior is observed in certain devices and browsers.

The first two cases (new browser window or browser refresh) typically result in unusable page download data for the first page instance. For example, the page may or may not have been rendered in the browser at the point when the second request came through. So, in this case, the system will check the time difference between the last artifact download time for the first page and second HTTP request. If the time difference exceeds a certain threshold, which may be ten seconds by default in one embodiment, the first page is deemed properly completed and will be reported as such. Otherwise, the first page download is closed and reported with COLLISION status. Pages with this status should not be used for KPI calculations.

The third case (browser self-refresh) can be detected by examining the referrer field. It will be exactly the same as primary URL of the web page. Here the algorithm would simply account for this object in the PDO and continue tracking the page, since it has not been completed and rendered from the user's perspective.

Handling Page Objects Using the PROCESS_PAGE_OBJECT Logic:

When arriving at this logic branch, there are one or more web pages already being tracked for a subscriber. The system needs to determine whether the incoming HTTP transaction belongs to one of these web pages, whether the incoming HTTP transaction signifies the end of the page download, or whether this is an unrelated object.

First, the algorithm examines the referrer field. If the referrer field is empty, the artifact typically does not belong to any tracked web page, except in case of favorite icon download. The browsers automatically request an icon from the web page without filling in referrer field. For example, "www.cnn.com" access will trigger "www.cnn.com/favicon.ie9.ico" download. If the URI extension is *.ico, the algorithm will search URI_MAP for the host, and associate the icon with that page, if found. Otherwise, this object is ignored.

Next, the algorithm will search the URI_MAP for a referrer field match. This can either be an exact match or a CSS/JavaScript pattern match with a special "www.host.com/!jscss!" URI pattern (i.e., in cases where referrer ends in .js or .css extension). If no match is found, the object is ignored.

At this point the system has determined that the HTTP artifact is related to a page download via referrer relation (or potentially through multiple levels of referrer indirection). Three decision branches are possible at this point:

1) Does this object indicate end of the page download?

If the HTTP URI matches one of the configured page stop markers, then the page is complete. If the object request time exceeds the silence period (e.g., 4 seconds) from the end of the last downloaded page's object, the page is considered complete.

2) Should the object be counted towards the page download?

Certain content types should not be accounted for in the download. For example, embedded video and audio files that may continue progressive downloading long after the page is rendered.

3) Does this object indicate off-page click?

If the content type of the object indicates an off-page click, then the web page is complete. Certain content types can only mean that a user has clicked on a link, such as, for example, PDF documents, Microsoft Word documents, ZIP files, etc.

If the content type of the object is text/html, for example, it may indicate either a click to another web page or an object that belongs to current page. In general, the algorithm cannot differentiate the two cases, so any HTML artifact download is assumed to be an off-page "click." To handle rare cases where HTML objects are actually part of the same page, the system allows the user to configure zero or more URI patterns that must be considered part of the existing page download and not an off-page "click." For example, referring to the data in FIG. 2, the system would be configured with URI patterns "mdb?", "client_204" and "generate_204" as shown in rows 5, 6, 7, 14, 16 and 18.

When processing HTML content types, the algorithm must verify the URI extension to ensure that it is not a picture (e.g., *.jpg, *.png, etc.) because many websites fill in the content type inappropriately for media artifacts, and this may trigger false end-of-page decisions.

If the logic above determines that the web page is complete, then it is reported to the upstream applications, and all related entries are removed from SUB_MAP and URI_MAP.

Otherwise, if the object is determined to be a part of an existing download, the counters and other information in the corresponding PDO are updated and the web page lifetime timer is restarted. In addition, the URI_MAP is updated with this artifact, because it may be the referrer for later artifacts (except for picture objects). For CSS/JavaScript objects, the system does not need to add the full referrer, only the special JS/CSS pattern if it does not yet exist in the map for this host. For other types of artifacts, the full URI is entered in the map to pick up subsequent objects by referrer.

Tables 1 and 2 below comprise example data comparisons based on HTTP flow record captures wherein a mobile user went to a web site main page from a mobile device, was redirected to a mobile version of the web site, and, after the web page download was complete (Table 1), the user clicked refresh to re-download the web page (Table 2). The tables show the actual parameters obtained by examining actual data captured using a network protocol analyzer, such as a WIRESHARK® analyzer, compared to the actual results reported by Tektronix Inc.'s GeoProbe G10 probe.

TABLE 1

| WWW.GOOGLE.FR (1ST DOWNLOAD) | ACTUAL PARAMETERS | MONITORING SYSTEM REPORTED PARAMETERS | DEVIATION |
|---|---|---|---|
| Download Time (seconds) | 5.195 | 5.194 | −0.02% |
| Objects | 10 | 10 | 0.00% |
| UL Packets | 68 | 68 | 0.00% |
| DL Packets | 112 | 112 | 0.00% |
| UL Bytes | 9099 | 9099 | 0.00% |
| DL Bytes | 139805 | 139805 | 0.00% |
| UL Throughput (Kbps) | 14.01 | 14.01 | −0.01% |
| DL Throughput (Kbps) | 215.29 | 215.33 | 0.02% |

TABLE 2

| WWW.GOOGLE.FR (2D DOWNLOAD) | ACTUAL PARAMETERS | MONITORING SYSTEM REPORTED | DEVIATION |
|---|---|---|---|
| Download Time (seconds) | 4.844 | 4.843 | −0.02% |

TABLE 2-continued

| WWW.GOOGLE.FR (2D DOWNLOAD) | ACTUAL PARAMETERS | MONITORING SYSTEM REPORTED | DEVIATION |
|---|---|---|---|
| Objects | 9 | 9 | 0.00% |
| UL Packets | 36 | 36 | 0.00% |
| DL Packets | 40 | 40 | 0.00% |
| UL Bytes | 7030 | 7030 | 0.00% |
| DL Bytes | 32765 | 32765 | 0.00% |
| UL Throughput (Kbps) | 11.61 | 11.61 | 0.00% |
| DL Throughput (Kbps) | 54.11 | 54.12 | 0.01% |

As shown in Tables 1 and 3, the actual parameters versus monitoring system detection results are almost identical. The slight difference shown is due to a couple of milliseconds time difference between original capture and a traffic generator feeding the probe when replaying the capture for analysis.

FIG. 2 is a table 200 of HTTP objects downloaded from the captures illustrated in Tables 1 and 2 for reference. The first download (Table 1) corresponds to HTTP transactions in rows 3 to 11 in table 200, and the second download (Table 2) corresponds to HTTP transactions in rows 13 to 30 of table 200.

Figure 3:
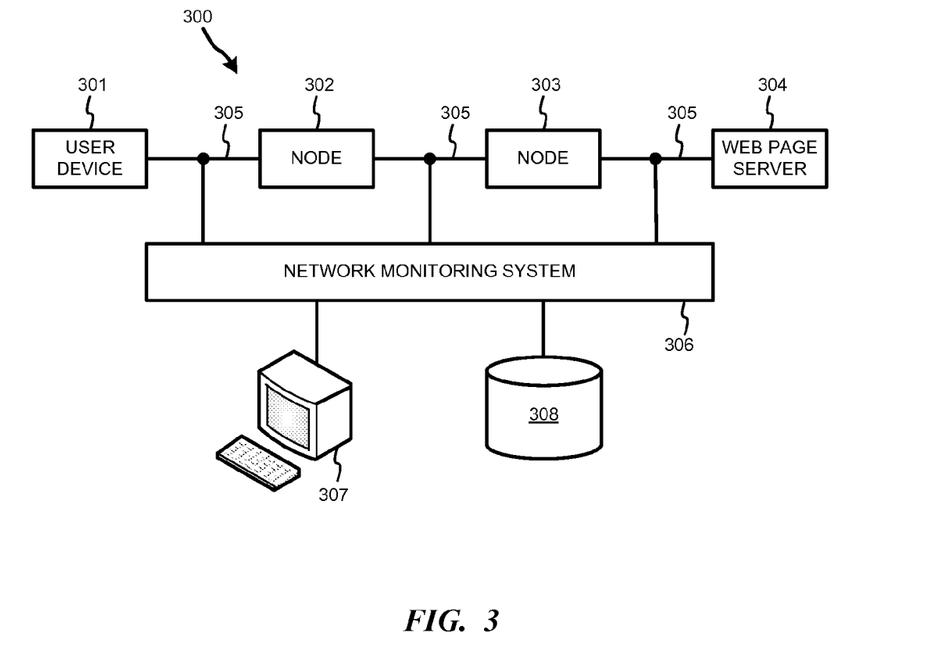
FIG. 3 illustrates a block diagram of a network monitoring environment according to some embodiments.

FIG. 3 illustrates a block diagram of a network monitoring environment according to some embodiments. Particularly, telecommunications network 300 includes network nodes 302, 303 and endpoints 301, 304. For example, network 300 may include a wireless broadband network, a 4G network, a 4G network, a 4GPP Long Term Evolution/Service Architecture Evolution (LTE/SAE) network, a voice-over-IP (VoIP) network, an IP Multimedia Subsystem (IMS) network, etc. Although only two nodes 302, 303 and two endpoints 301, 304 are shown in FIG. 1, it will be understood that network 300 may comprise any number of nodes and endpoints. Moreover, it will be understood that the nodes 302, 303 and endpoints 301, 304 in network 300 may be interconnected in any suitable manner, including being coupled to one or more other nodes and/or endpoints.

In some implementations, user device endpoint 301 may represent, for example, computers, mobile devices, user equipment (UE), client applications, server applications, or the like. Meanwhile, nodes 302, 303 may be components in an intranet, Internet, or public data network, such as a router or gateway. Nodes 302, 303 may also be components in a 4G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, a Mobile Management Entity (MME) in a LTE/SAE network or any other core network nodes or routers that transfer data packets or messages between user device 301 and web page server 304.

Each communication session for the user device 301 may have different start and stop times, and may be subject to different network traffic constraints. During each session, the available bandwidth for that session may change multiple times. Also, a data stream may start and stop during a given session.

Many packets traverse links 305 and nodes 302, 303, as data is exchanged between user device 301 and web page server 304. These packets may represent many different sessions and protocols. For example, if user device 301 is used for a voice or video call, then it may exchange Voice over Internet Protocol (VoIP) or Session Initiation Protocol (SIP) data packets with a SIP/VoIP server (i.e., the other endpoint 101) using Real-Time Transport Protocol (RTP). If user device 301 is used to send or retrieve email, then it may exchange Internet Message Access Protocol (IMAP), Post Office Protocol 4 Protocol (POP3), or Simple Mail Transfer Protocol (SMTP) messages with an email server. If user device 301 is used to download or stream video, it may use Real Time Streaming Protocol (RTSP) to establish and control media sessions with a video server. Alternatively, user device 301 may access a number of websites using Hypertext Transfer Protocol (HTTP) to exchange data packets with a web page server 304. It will be understood that packets exchanged between devices 301 and 304 may conform to numerous other protocols now known or later developed.

Network monitoring system 306 may be used to monitor the performance of network 100. Particularly, monitoring system 306 captures packets that are transported across links or interfaces 305 between user device 301, nodes 302, 303, web page server 304, and/or other endpoints and/or across any other network links or connections (not shown). In some embodiments, packet capture devices may be non-intrusively coupled to network links 305 to capture substantially all of the packets transmitted across the links. Although only three links 305 are shown in FIG. 3, it will be understood that in an actual network there may be dozens or hundreds of physical, logical or virtual connections and links between network nodes. In some cases, network monitoring system 306 may be coupled to all or a high percentage of these links. In other embodiments, monitoring system 305 may be coupled only to a portion of network 300, such as only to links associated with a particular carrier or service provider. The packet capture devices may be part of network monitoring system 306, such as a line interface card, or may be separate components that are remotely coupled to network monitoring system 306 from different locations.

Accordingly, network monitoring system 306 may be configured to sample (e.g., unobtrusively) related data packets for a communication session in order to track the same set of user experience information for each session and each client without regard to the protocol (e.g. HTTP, RTMP, RTP, etc.) used to support the session. For example, by identifying, calculating, and/or determining web page download times, monitoring system 306 may be capable of identifying certain information about each user's experience, as described in more detail below. A service provider may use this information, for instance, to adjust the network services available to user device 301 such as the bandwidth assigned to each user, and the routing of data packets through network 300.

Monitoring system 306 may include one or more processors running one or more software applications that collect, correlate and/or analyze media and signaling data packets from network 300. Monitoring system 306 may incorporate protocol analyzer, session analyzer, and/or traffic analyzer functionality that provides OSI (Open Systems Interconnection) Layer 3 to Layer 7 troubleshooting by characterizing IP traffic by links, nodes, applications and servers on network 300. In some embodiments, these operations may be provided, for example, by the IRIS® toolset available from Tektronix, Inc., although other suitable tools may exist or be later developed. The packet capture devices coupling network monitoring system 306 to links 305 may be high-speed, high-density 10GE probes that are optimized to handle high bandwidth IP traffic, such as the GEOPROBE® G10, also available from Tektronix, Inc., although other suitable tools may exist or be later developed. A service provider or network operator may access data from monitoring system 306 via user interface station 307 having a display or graphical user interface, such as the IRISVIEW configurable software framework that provides a single, integrated platform for several applications, including feeds to customer experience management systems and operation support system (OSS) and business support system (BSS) applications, which is also available from Tektronix, Inc., although other suitable tools may exist or be later developed.

Monitoring system 306 may further comprise internal or external memory 308 for storing captured data packets, user session data, and configuration information. Monitoring system 306 may capture and correlate the packets associated specific data sessions on links 305. In some embodiments, related packets can be correlated and combined into a record for a particular flow, session or call on network 300. These data packets or messages may be captured in capture files. A trace application may be used to categorize messages into transactions and to create Flow Records and transaction detail records.

As the capability of network 300 increases toward 10GE and beyond (e.g., 100GE), each link 305 may support more users' flows and sessions. Thus, in some embodiments, each link 305 may be a 10GE or a collection of 10GE links (e.g., one or more 100GE links) supporting thousands or tens of thousands of users or subscribers. Many of the subscribers may have multiple active sessions, which may result in an astronomical number of active flows on link 305 at any time where each flow includes many packets.

Figure 4:
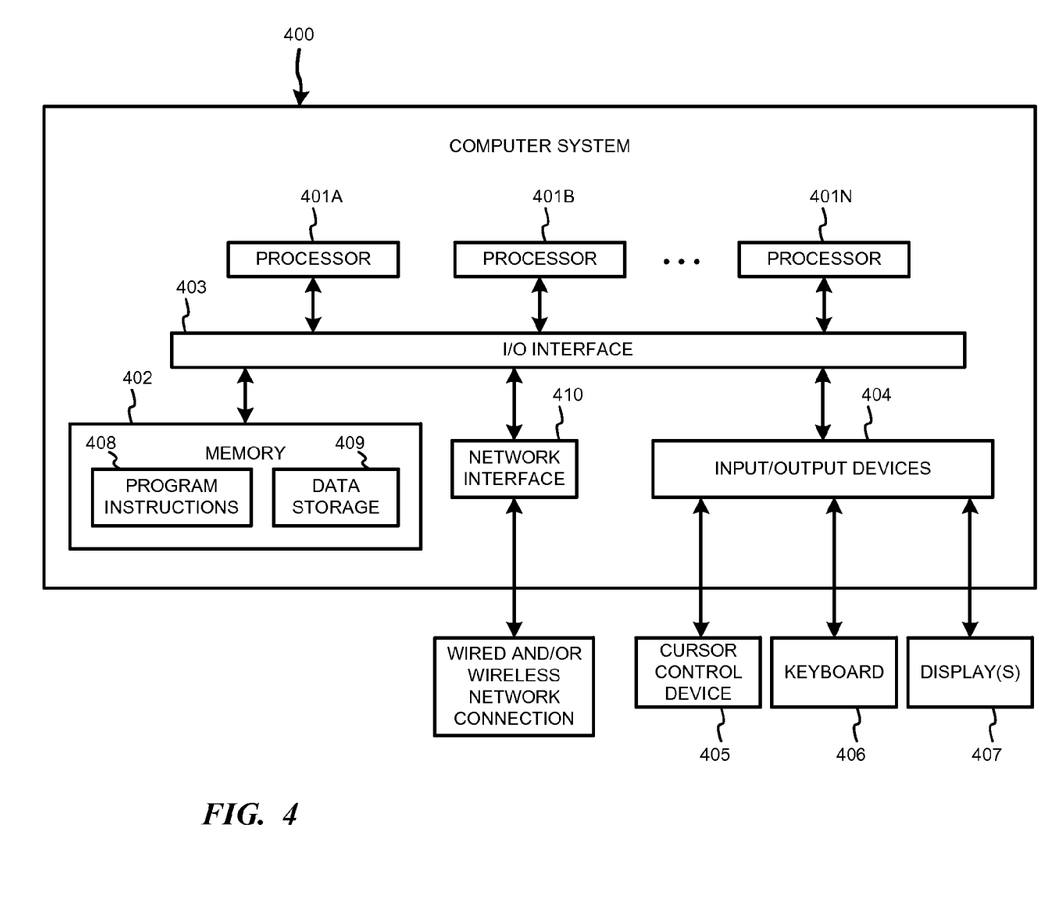
FIG. 4 is a block diagram of a computer system configured to implement various systems and methods described herein according to some embodiments.

Aspects of network monitoring system 306 may be implemented or executed by one or more computer systems. One such computer system is illustrated in FIG. 4. In various embodiments, computer system 400 may be a server, a mainframe computer system, a workstation, a network computer, a desktop computer, a laptop, or the like. For example, in some cases, front-end monitoring probe 305 shown in FIG. 3 may be implemented as computer system 400. As explained above, in different embodiments these various computer systems may be configured to communicate with each other in any suitable way, such as, for example, via network 300.

As illustrated, computer system 400 includes one or more processors 401A-N coupled to a system memory 402 via an input/output (I/O) interface 403. Computer system 400 further includes a network interface 410 coupled to I/O interface 403, and one or more input/output devices 404, such as cursor control device 405, keyboard 406, and display(s) 407. In some embodiments, a given entity (e.g., network monitoring system 306) may be implemented using a single instance of computer system 400, while in other embodiments multiple such systems, or multiple nodes making up computer system 400, may be configured to host different portions or instances of embodiments. For example, in an embodiment some elements may be implemented via one or more nodes of computer system 400 that are distinct from those nodes implementing other elements.

In various embodiments, computer system 400 may be a single-processor system including one processor 401A, or a multi-processor system including two or more processors 401A-N (e.g., two, four, eight, or another suitable number). Processor(s) 401A-N may be any processor capable of executing program instructions. For example, in various embodiments, processor(s) 401A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 401A-N may commonly, but not necessarily, implement the same ISA. Also, in some embodiments, at least one processor(s) 401A-N may be a graphics processing unit (GPU) or other dedicated graphics-rendering device.

System memory 402 may be configured to store program instructions and/or data accessible by processor(s) 401A-N. In various embodiments, system memory 402 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 402 as program instructions 408 and data storage 409, respectively. In other embodiments, program instructions and/or data may be received, sent or stored upon different types of computer-accessible media or on similar media separate from system memory 402 or computer system 400. Generally speaking, a computer-accessible medium may include any tangible, non-transitory storage media or memory media such as magnetic or optical media—e.g., disk or CD/DVD-ROM coupled to computer system 400 via I/O interface 403.

The terms "tangible" and "nontransitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 403 may be configured to coordinate I/O traffic between processor 401, system memory 402, and any peripheral devices in the device, including network interface 410 or other peripheral interfaces, such as input/output devices 404. In some embodiments, I/O interface 403 may perform any necessary protocol, timing or other data transformations to convert data signals from one component (e.g., system memory 402) into a format suitable for use by another component (e.g., processor(s) 401A-N). In some embodiments, I/O interface 403 may include support for devices attached through various types of peripheral buses, such as a variant of the Peripheral Component Interconnect (PCI) bus standard or the Universal Serial Bus (USB) standard, for example. In some embodiments, the function of I/O interface 403 may be split into two or more separate components, such as a north bridge and a south bridge, for example. In addition, in some embodiments some or all of the functionality of I/O interface 403, such as an interface to system memory 402, may be incorporated directly into processor(s) 401A-N.

Network interface 410 may be configured to allow data to be exchanged between computer system 400 and other devices attached to network 300, such as other computer systems, or between nodes of computer system 400. In various embodiments, network interface 410 may support communication via wired or wireless general data networks, such as any suitable type of Ethernet network, for example; via telecommunications/telephony networks such as analog voice networks or digital fiber communications networks;

via storage area networks such as Fiber Channel SANs, or via any other suitable type of network and/or protocol.

Input/output devices 404 may, in some embodiments, include one or more display terminals, keyboards, keypads, touch screens, scanning devices, voice or optical recognition devices, or any other devices suitable for entering or retrieving data by one or more computer system 400. Multiple input/output devices 404 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 410.

As shown in FIG. 4, memory 402 may include program instructions 408, configured to implement certain embodiments described herein, and data storage 409, comprising various data accessible by program instructions 408. In an embodiment, program instructions 408 may include software elements of embodiments illustrated in FIG. 3. For example, program instructions 408 may be implemented in various embodiments using any desired programming language, scripting language, or combination of programming languages and/or scripting languages (e.g., C, C++, C#, JAVA®, JAVASCRIPT®, PERL®, etc.). Data storage 409 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The various techniques described herein may be implemented in software, hardware, or a combination thereof. The order in which each operation of a given method is performed may be changed, and various elements of the systems illustrated herein may be added, reordered, combined, omitted, modified, etc. It will be understood that various operations discussed herein may be executed simultaneously and/or sequentially. It will be further understood that each operation may be performed in any order and may be performed once or repetitiously. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
performing, by one or more computer systems,
receiving HTTP transaction data;
extracting a host and URI from the HTTP transaction data;
retrieving a subscriber record using at least one of an IP address and link identifier in the HTTP transaction data;
evaluating whether at least one of the host and URI correspond to a web page that is configured;
if the web page is configured, evaluating whether the subscriber record is already tracking web page data;
creating a new entry for the web page in the subscriber record, if the subscriber record is not already tracking web page data;
inserting a new page data object into the subscriber record using a primary page URI as the key;
extracting transaction timing information and at least one of byte and packet counts from the HTTP transaction data to populate in the page data object; and
starting a lifetime timer for the page data object.

2. The method of claim 1, further comprising:
if the subscriber record is already tracking web page data, evaluating whether the HTTP transaction data corresponds to an existing web page entry; and
creating a new entry for the web page in the subscriber record, if the HTTP transaction data does not correspond to an existing web page entry in the subscriber record.

3. The method of claim 1, wherein a value of the lifetime timer is selected to make sure that all artifacts related to the web page are received before the page data object is closed.

4. The method of claim 1, further comprising:
if a redirect or failure response code is present in the HTTP transaction data, then reporting the web page data to other applications.

5. The method of claim 1, further comprising:
if an HTTP response code indicates success, inserting a secondary URI key into a URI map; and
associating the secondary URI key with the page data object.

6. The method of claim 1, further comprising:
extracting subscriber and equipment data from a subscriber GTP session context; and populating the subscriber and equipment data in the page data object.

7. The method of claim 1, further comprising:
if the subscriber record is already tracking web page data, evaluating whether the HTTP transaction data corresponds to an existing web page entry; and
updating a new entry for the web page in the subscriber record, if the HTTP transaction data corresponds to an existing web page entry in the subscriber record.

8. The method of claim 7, further comprising:
checking a time difference between a last artifact download time for a first web page and a time of a second HTTP request;
if the time exceeds a threshold, reporting the first page a properly completed; and
if the time does not exceed the threshold, closing a first page download and removing the first pages from key performance indicator (KPI) calculations.

9. The method of claim 7, further comprising:
examining a referrer field in the HTTP transaction data; and
if the referrer field is the same as a primary URL of the web page, continue tracking the web page and adding data to the page data object.

10. The method of claim 1, further comprising:
if the web page is not configured, evaluating whether the subscriber record is already tracking web page data; and
if the subscriber record is already tracking web page data, processing page object data from the HTTP transaction data.

11. The method of claim 10, further comprising:
identifying that a web page has completed downloading, and
reporting the page data object as complete.

12. The method of claim 11, wherein the web page has completed downloading if the HTTP URI matches a configured web page's stop markers, if an object request exceeds a silence period, or if a content type indicates an off-page request.

13. The method of claim 10, further comprising:
identifying embedded audio or video content in the HTTP transaction data; and
excluding data associated with the audio or video content from the page data object.

14. A method, comprising:
performing, by one or more computer systems,
receiving HTTP transaction data;
extracting a host and URI from the HTTP transaction data;
retrieving a subscriber record using at least one of an IP address and link identifier in the HTTP transaction data;
evaluating whether at least one of the host and URI correspond to a web page that is configured;
if the web page is configured, evaluating whether the subscriber record is already tracking web page data; and
creating a new entry for the web page in the subscriber record, if the subscriber record is not already tracking web page data;
if the subscriber record is already tracking web page data, evaluating whether the HTTP transaction data corresponds to an existing web page entry;
updating a new entry for the web page in the subscriber record, if the HTTP transaction data corresponds to an existing web page entry in the subscriber record;
checking a time difference between a last artifact download time for a first web page and a time of a second HTTP request;
if the time exceeds a threshold, reporting the first page as properly completed; and
if the time does not exceed the threshold, closing a first page download and removing the first page from key performance indicator (KPI) calculations.

* * * * *